United States Patent

Cho et al.

(10) Patent No.: US 9,458,912 B2
(45) Date of Patent: Oct. 4, 2016

(54) MULTI-STAGE TRANSMISSION FOR VEHICLE

(71) Applicant: HYUNDAI MOTOR COMPANY, Seoul (KR)

(72) Inventors: Won Min Cho, Hwaseong-si (KR); Jae Chang Kook, Hwaseong-si (KR); Myeong Hoon Noh, Seongnam-si (KR); Seong Wook Ji, Ansan-si (KR); Kang Soo Seo, Yongin-si (KR); Seong Wook Hwang, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/839,394

(22) Filed: Aug. 28, 2015

(65) Prior Publication Data

US 2016/0230848 A1 Aug. 11, 2016

(30) Foreign Application Priority Data

Feb. 9, 2015 (KR) .......................... 10-2015-0019688

(51) Int. Cl.
*F16H 3/66* (2006.01)

(52) U.S. Cl.
CPC .......... *F16H 3/66* (2013.01); *F16H 2200/0069* (2013.01); *F16H 2200/2012* (2013.01); *F16H 2200/2046* (2013.01)

(58) Field of Classification Search
None
See application file for complete search history.

(56) References Cited

U.S. PATENT DOCUMENTS

| 8,303,455 | B2 | 11/2012 | Gumpoltsberger et al. |
| 2009/0247351 | A1* | 10/2009 | Seo .......................... F16H 3/666 475/275 |
| 2013/0260943 | A1* | 10/2013 | Brehmer ................... F16H 3/66 475/275 |
| 2015/0167790 | A1* | 6/2015 | Noh .......................... F16H 3/62 475/275 |
| 2015/0354670 | A1* | 12/2015 | Goleski ..................... F16H 3/66 475/311 |
| 2016/0091058 | A1* | 3/2016 | Noh .......................... F16H 3/66 475/278 |

FOREIGN PATENT DOCUMENTS

KR 10-1448789 (B1) 10/2014

OTHER PUBLICATIONS

Korean Office Action from corresponding Korean application No. 10-2015-0019688 dated Apr. 8, 2016 ((5 pgs).

* cited by examiner

*Primary Examiner* — Justin Holmes
(74) *Attorney, Agent, or Firm* — Brinks Gilson & Lione

(57) ABSTRACT

The present disclosure relates to a multi-stage transmission for a vehicle that includes four planetary gear devices and six shifting elements, and each of the planetary gear devices include three rotary elements selectively connected to the six shifting elements, preferably so that the multi-stage transmission provides at least ten forward shifting stages and at least one reverse shifting stage with a relatively small number of parts and a simple configuration. In this configuration, an engine may be operated at desired operation points, to improve the fuel efficiency of the vehicle and improve the quietness of the vehicle.

7 Claims, 1 Drawing Sheet

Figures 1, 2:
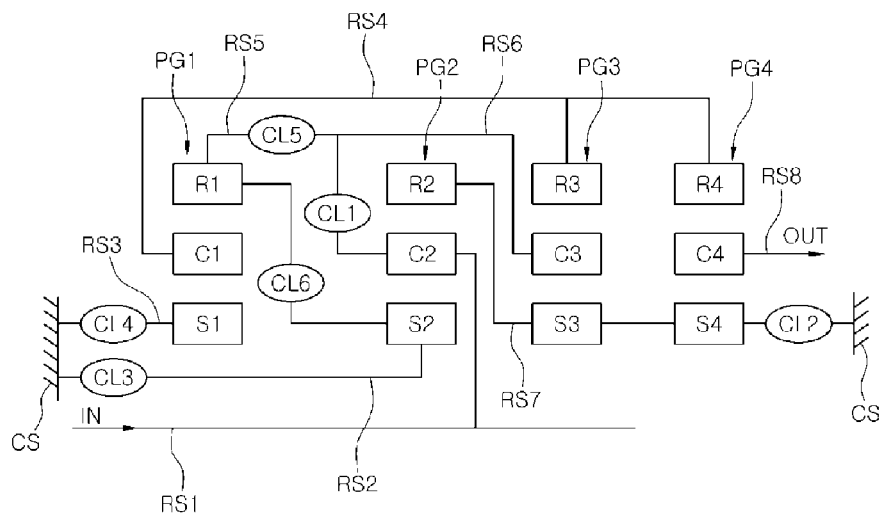

| SHIFTING POSITION | CL1 | CL2 | CL3 | CL4 | CL5 | CL6 | GEAR RATIO |
|---|---|---|---|---|---|---|---|
| 1ST | | | O | O | | O | 3.133 |
| 2ND | | | | O | O | O | 1.642 |
| 3RD | | | O | O | O | | 1.263 |
| 4TH | O | | | O | O | | 1.137 |
| 5TH | O | | O | | O | | 1.099 |
| 6TH | O | | | | O | O | 1.000 |
| 7TH | O | | | O | | O | 0.933 |
| 8TH | O | O | | | | O | 0.847 |
| 9TH | | O | | O | | O | 0.635 |
| 10TH | | O | | | O | O | 0.282 |
| REV | | | O | | O | O | 3.686 |

MULTI-STAGE TRANSMISSION FOR VEHICLE

CROSS-REFERENCE TO RELATED APPLICATION

This application claims the benefit of Korean Patent Application No. 10-2015-0019688, filed on Feb. 9, 2015, the entire contents of which are incorporated herein by reference.

FIELD

The present disclosure generally relates to a multi-stage transmission for a vehicle.

BACKGROUND

The statements in this section merely provide background information related to the present disclosure and may not constitute prior art.

Recent rising oil prices have driven worldwide car manufacturers into unlimited competition to improve fuel efficiency. In addition, great efforts have been made to reduce the weight and improve the fuel efficiency of engines based on a variety of techniques such as downsizing and similar measures.

Another method used to improve fuel efficiency is allowing an engine to operate at more efficient operation points using the multi-staging of a transmission.

Additionally, the multi-staging of a transmission allows an engine to operate in a relatively low RPM (revolutions per minute) range, thereby improving the quietness of a vehicle.

However, as the number of shifting stages of a transmission increases, the number of internal parts constituting the transmission also increases. This may lead to undesirable effects, such as reduced mountability and transfer efficiency of the transmission and increased cost and weight of the transmission.

SUMMARY

The present disclosure provides a multi-stage transmission for a vehicle that is able to realize at least ten forward shifting stages and one reverse shifting stage with a relatively small number of parts and a simple configuration such that an engine may be operated at desired operation points, thereby improving the fuel efficiency of the vehicle, and improving the quietness of the vehicle.

According to one aspect of the present disclosure, a multi-stage transmission for a vehicle is provided including: an input shaft; an output shaft; a first, second, third, and fourth planetary gear device disposed between the input shaft and the output shaft to transmit rotary force, each of the planetary gear devices having three rotary elements; and at least six shifting elements connected to the rotary elements of the planetary gear devices. A first rotary element of the first planetary gear device may be installed to be fixable by one shifting element of the at least six shifting elements, a second rotary element of the first planetary gear device may be permanently connected to a third rotary element of the third planetary gear device and a third rotary element of the fourth planetary gear device, and a third rotary element of the first planetary gear device may be variably or selectively connected to a first rotary element of the second planetary gear device and a second rotary element of the third planetary gear device. The first rotary element of the second planetary gear device may be installed to be fixable by another shifting element of the at least six shifting elements, a second rotary element of the second planetary gear device may be permanently connected to the input shaft and variably or selectively connected to the second rotary element of the third planetary gear device, and a third rotary element of the second planetary gear device may be permanently connected to a first rotary element of the third planetary gear device. The first rotary element of the third planetary gear device may be permanently connected to a first rotary element of the fourth planetary gear device. The first rotary element of the fourth planetary gear device may be installed to be fixable by still another shifting element of the at least six shifting elements, and a second rotary element of the fourth planetary gear device may be permanently connected to the output shaft.

According to one form of the present disclosure as set forth above, the multi-stage transmission for a vehicle can realize at least ten forward shifting stages and one reverse shifting stage with a relatively small number of parts and a simple configuration such that the engine may be operated at desired operation points, thereby improving the fuel efficiency of the vehicle, and improving the quietness of the vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a diagram illustrating a configuration of a multi-stage transmission for a vehicle according to an exemplary form of the present disclosure; and FIG. 2 is a table showing operation modes of the transmission shown in FIG. 1.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like of corresponding parts and features.

The present disclosure relates to a multi-stage transmission for a vehicle.

Referring to FIGS. 1 and 2, a multi-stage transmission for a vehicle according to one form of the present disclosure may include an input shaft "IN"; an output shaft "OUT"; a first planetary gear device "PG1", a second planetary gear device "PG2", a third planetary gear device "PG3", and a fourth planetary gear device "PG4" disposed between the input shaft "IN" and the output shaft "OUT" to transmit rotary force, each of the planetary gear devices "PG1", "PG2". "PG3", and PG4 having three rotary elements; and at least six shifting elements (e.g. clutches CL1-CL6) connected to rotary elements of the planetary gear devices.

A first rotary element S1 of the first planetary gear device PG1 may be installed to be fixable by one shifting element of the at least six shifting elements. A second rotary element C1 of the first planetary gear device PG1 may be permanently connected to a third rotary element R3 of the third planetary gear device PG3 and a third rotary element R4 of the fourth planetary gear device PG4. A third rotary element R1 of the first planetary gear device PG1 may be selectively or variably connected to a first rotary element S2 of the second planetary gear device PG2 and a second rotary element C3 of the third planetary gear device PG3.

The first rotary element S2 of the second planetary gear device PG2 may be installed to be fixable, i.e. fixed in place or made stationary, by another shifting element of the at least six shifting elements, a second rotary element C2 of the second planetary gear device PG2 may be permanently connected to the input shaft IN and selectively connected to the second rotary element C3 of the third planetary gear device PG3, and the third rotary element R2 of the second planetary gear device PG2 may be permanently connected to a first rotary element S3 of the third planetary gear device PG3.

The first rotary element S3 of the third planetary gear device PG3 may be permanently connected to a first rotary element S4 of the fourth planetary gear device PG4.

The first rotary element S4 of the fourth planetary gear device PG4 may be installed to be fixable by still another shifting element of the at least six shifting elements, and a second rotary element C4 of the fourth planetary gear device PG4 may be permanently connected to the output shaft OUT.

The first planetary gear device PG1, the second planetary gear device PG2, the third planetary gear device PG3 and the fourth planetary gear device PG4 may be sequentially arranged along the axial direction of the input shaft IN and the output shaft OUT.

More specifically, the first rotary element S1 of the first planetary gear device PG1 may be installed to be fixable to a transmission case CS by means of a fourth clutch CL4 from among the at least six shifting elements. The first rotary element S2 of the second planetary gear device PG2 may be installed to be fixable to the transmission case CS by means of a third clutch CL3 from among the at least six shifting elements. The first rotary element S4 of the fourth planetary gear device PG4 may be installed to be fixable to the transmission case CS by means of a second clutch CL2 from among the at least six shifting elements.

Accordingly, the second clutch CL2, the third clutch CL3 and the fourth clutch CL4 function as brakes, respectively, such that the first rotary element S4 of the fourth planetary gear device PG4, the first rotary element S2 of the second planetary gear device PG2 and the first rotary element S1 of the first planetary gear device PG1 may be converted to a rotatable state wherein rotation is allowed or a restrained state wherein rotation is restricted by means of the operations of the second clutch CL2, the third clutch CL3 and the fourth clutch CL4, respectively.

The other shifting elements from among the at least six shifting elements may be configured to constitute variable connection structures between the rotary elements of the planetary gear devices.

That is, the first clutch CL1 from among the at least six shifting elements may form a variable connection structure between the second rotary element C2 of the second planetary gear device PG2 and the second rotary element C3 of the third planetary gear device PG3. The fifth clutch CL5 from among the at least six shifting elements may form a variable connection structure between the third rotary element R1 of the first planetary gear device PG1 and the second rotary element C3 of the third planetary gear device PG3. The sixth clutch CL6 from among the at least six shifting elements may form a variable connection structure between the third rotary element R1 of the first planetary gear device PG1 and the first rotary element S2 of the second planetary gear device PG2.

In one exemplary form, the first rotary element S1, the second rotary element C1 and the third rotary element R1 of the first planetary gear device PG1 are a first sun gear, a first carrier and a first ring gear, respectively. The first rotary element S2, the second rotary element C2 and the third rotary element R2 of the second planetary gear device PG2 are a second sun gear, a second carrier and a second ring gear, respectively. The first rotary element S3, the second rotary element C3 and the third rotary element R3 of the third planetary gear device PG3 are a third sun gear, a third carrier and a third ring gear, respectively. The first rotary element S4, the second rotary element C4 and the third rotary element R4 of the fourth planetary gear device PG4 are a fourth sun gear, a fourth carrier and a fourth ring gear, respectively.

In another form, the multi-stage transmission for a vehicle according to the present invention may include the first to fourth planetary gear devices PG1 to PG4 each having the three rotary elements; the six shifting elements configured to selectively provide frictional force; and eight rotary shafts connected to the rotary elements of the first to fourth planetary gear devices.

Hence, from among the eight rotary shafts, the first rotary shaft RS1 may be the input shaft IN directly connected to the second rotary element C2 of the second planetary gear device PG2. The second rotary shaft RS2 may be directly connected to the first rotary element S2 of the second planetary gear device PG2. The third rotary shaft RS3 may be directly connected to the first rotary element S1 of the first planetary gear device PG1. The fourth rotary shaft RS4 may be directly connected to the second rotary element C1 of the first planetary gear device PG1, the third rotary element R3 of the third planetary gear device PG3 and the third rotary element R4 of the fourth planetary gear device PG4. The fifth rotary shaft RS5 may be directly connected to the third rotary element R1 of the first planetary gear device PG1. The sixth rotary shaft RS6 may be directly connected to the second rotary element C3 of the third planetary gear device PG3. The seventh rotary shaft RS7 may be directly connected to the third rotary element R2 of the second planetary gear device PG2, the first rotary element S3 of the third planetary gear device PG3 and the first rotary element S4 of the fourth planetary gear device PG4. The eighth rotary shaft RS8 may be the output shaft OUT directly connected to the second rotary element C4 of the fourth planetary gear device PG4.

In addition, from among the six shifting elements, the first clutch CL1 may be disposed between the first rotary shaft RS1 and the sixth rotary shaft RS6. The second clutch CL2 may be disposed between the seventh rotary shaft RS7 and the transmission case CS. The third clutch CL3 may be disposed between the second rotary shaft RS2 and the transmission case CS. The fourth clutch CL4 may be disposed between the third rotary shaft RS3 and the transmission case CS. The fifth clutch CL5 may be disposed between the fifth rotary shaft RS5 and the sixth rotary shaft RS6. The sixth clutch CL6 may be disposed between the second rotary shaft RS2 and the fifth rotary shaft RS5.

As set forth above, the multi-stage transmission for a vehicle according to the present disclosure including the four simple planetary gear devices and the six shifting elements realizes ten forward shifting stages and one reverse shifting stage according to the operation mode table as illustrated in FIG. 2. Since the multi-stage shifting stages of ten shifting stages can be embodied based on a relatively small number of parts and a simple configuration, the multi-stage transmission for a vehicle of the present disclosure improves fuel efficiency and quietness of a vehicle, thereby ultimately improving the marketability of the vehicle.

Although the exemplary forms of the present disclosure have been described for illustrative purposes, a person skilled in the art will appreciate that various modifications, additions and substitutions are possible, without departing from the scope and spirit of the present disclosure.

What is claimed is:

1. A multi-stage transmission for a vehicle, comprising:
   an input shaft;
   an output shaft;
   a first planetary gear device, a second planetary gear device, a third planetary gear device, and a fourth planetary gear device disposed between the input shaft and the output shaft to transmit rotary force, each of the first, second, third, and fourth planetary gear devices having a first, second, and third rotary element; and
   at least six shifting elements, each shifting element connected to at least one of the first, second, and third rotary elements of the first, second, third, and fourth planetary gear devices;
   wherein the first rotary element of the first planetary gear device is installed to be fixable by a first shifting element of the at least six shifting elements, the second rotary element of the first planetary gear device is permanently connected to the third rotary element of the third planetary gear device and the third rotary element of the fourth planetary gear device, and the third rotary element of the first planetary gear device is selectively connected to the first rotary element of the second planetary gear device and the second rotary element of the third planetary gear device;
   wherein the first rotary element of the second planetary gear device is installed to be fixable by a second shifting element of the at least six shifting elements, the second rotary element of the second planetary gear device is permanently connected to the input shaft and selectively connected to the second rotary element of the third planetary gear device, and the third rotary element of the second planetary gear device is permanently connected to the first rotary element of the third planetary gear device;
   wherein the first rotary element of the third planetary gear device is permanently connected to the first rotary element of the fourth planetary gear device; and
   wherein the first rotary element of the fourth planetary gear device is installed to be fixable by a third shifting element of the at least six shifting elements, and the second rotary element of the fourth planetary gear device is permanently connected to the output shaft.

2. The multi-stage transmission according to claim 1, wherein the first planetary gear device, the second planetary gear device, the third planetary gear device, and the fourth planetary gear device are sequentially arranged along an axial direction of the input shaft and the output shaft.

3. The multi-stage transmission according to claim 2, wherein:
   the first rotary element of the first planetary gear device is installed to be fixable to a transmission case by a fourth clutch of the at least six shifting elements;
   the first rotary element of the second planetary gear device is installed to be fixable to the transmission case by a third clutch of the at least six shifting elements;
   the first rotary element of the fourth planetary gear device is installed to be fixable to the transmission case by a second clutch of the at least six shifting elements; and
   the other shifting elements of the at least six shifting elements are configured to constitute variable connection structures between the rotary elements of the first, second, third, and fourth planetary gear devices.

4. The multi-stage transmission according to claim 3, wherein:
   a first clutch from among the at least six shifting elements forms a variable connection structure between the second rotary element of the second planetary gear device and the second rotary element of the third planetary gear device;
   a fifth shifting element from among the at least six shifting elements forms a variable connection structure between the third rotary element of the first planetary gear device and the second rotary element of the third planetary gear device; and
   a sixth shifting element from among the at least six shifting elements forms a variable connection structure between the third rotary element of the first planetary gear device and the first rotary element of the second planetary gear device.

5. A multi-stage transmission for a vehicle, comprising:
   a first planetary gear device, a second planetary gear device, a third planetary gear device, and a fourth planetary gear device each having a first, second, and third rotary element;
   six shifting elements configured to selectively provide frictional force;
   eight rotary shafts selectively connected to the first, second, and third rotary elements of the first, second, third, and fourth planetary gear devices,
   wherein a first rotary shaft of the eight rotary shafts is an input shaft directly connected to the second rotary element of the second planetary gear device, and wherein a second rotary shaft of the eight rotary shafts is directly connected to the first rotary element of the second planetary gear device, and wherein a third rotary shaft of the eight rotary shafts is directly connected to the first rotary element of the first planetary gear device, and wherein a fourth rotary shaft of the eight rotary shafts is directly connected to the second rotary element of the first planetary gear device, the third rotary element of the third planetary gear device and the third rotary element of the fourth planetary gear device, and wherein a fifth rotary shaft of the eight rotary shafts is directly connected to the third rotary element of the first planetary gear device, and wherein a sixth rotary shaft of the eight rotary shafts is directly connected to the second rotary element of the third planetary gear device, and wherein a seventh rotary shaft of the eight rotary shafts is directly connected to the third rotary element of the second planetary gear device, the first rotary element of the third planetary gear device and the first rotary element of the fourth planetary gear device, and wherein an eighth rotary shaft of the eight rotary shafts is the output shaft directly connected to the second rotary element of the fourth planetary gear device; and
   wherein the six shifting elements include six clutches, a first clutch disposed between the first rotary shaft and the sixth rotary shaft, a second clutch disposed between the seventh rotary shaft and a transmission case, a third clutch disposed between the second rotary shaft and the transmission case, a fourth clutch disposed between the third rotary shaft and the transmission case, a fifth clutch disposed between the fifth rotary shaft and the sixth rotary shaft, and a sixth clutch disposed between the second rotary shaft and the fifth rotary shaft.

6. The multi-stage transmission according to claim 5, wherein the first planetary gear device, the second planetary gear device, the third planetary gear device and the fourth planetary gear device are sequentially arranged along an axial direction of the input shaft and the output shaft.

7. The multi-stage transmission according to claim 5, wherein:
- the first clutch from among the at least six shifting elements forms a variable connection structure between the second rotary element of the second planetary gear device and the second rotary element of the third planetary gear device,
- the fifth clutch from among the at least six shifting elements forms a variable connection structure between the third rotary element of the first planetary gear device and the second rotary element of the third planetary gear device, and
- the sixth clutch from among the at least six shifting elements forms a variable connection structure between the third rotary element of the first planetary gear device and the first rotary element of the second planetary gear device.

\* \* \* \* \*